US007703378B2

(12) United States Patent
Chen

(10) Patent No.: US 7,703,378 B2

(45) Date of Patent: Apr. 27, 2010

(54) BEVERAGE HEATING METHOD AND BEVERAGE HEATER APPARATUS USING THE SAME

(75) Inventor: Chien-Jung Chen, Kaohsiung (TW)

(73) Assignee: Yen Sun Technology Corp., Kaohsiung Hsien (TW)

(*) Notice: Subject to any disclaimer, the term of this patent is extended or adjusted under 35 U.S.C. 154(b) by 648 days.

(21) Appl. No.: 11/543,889

(22) Filed: Oct. 6, 2006

(65) Prior Publication Data

US 2007/0245900 A1 Oct. 25, 2007

(30) Foreign Application Priority Data

Apr. 21, 2006 (TW) .............................. 95206856 U
Jul. 21, 2006 (TW) .............................. 95126717 A

(51) Int. Cl.
*A47J 31/00* (2006.01)
*B65B 29/02* (2006.01)

(52) U.S. Cl. .......................................... 99/279; 426/77

(58) Field of Classification Search ................... 99/279, 99/275, 276, 277, 278–323.3; 422/255–309; 426/77, 78, 79, 80, 81, 82, 83, 84
See application file for complete search history.

(56) References Cited

U.S. PATENT DOCUMENTS 4,871,089 A 10/1989 Rader et al.
4,978,833 A * 12/1990 Knepler ...................... 392/449
5,309,821 A * 5/1994 Knepler ........................ 99/282
5,314,586 A 5/1994 Chen et al.
2005/0178273 A1* 8/2005 Meuleners et al. ............ 99/279
2006/0051285 A1* 3/2006 Hawker et al. .............. 423/477
2008/0000358 A1* 1/2008 Goeckner et al. ............. 99/281

FOREIGN PATENT DOCUMENTS

TW M282132 U 12/2005

* cited by examiner

*Primary Examiner*—Daniel L Robinson
(74) *Attorney, Agent, or Firm*—Muncy, Geissler, Olds & Lowe, PLLC

(57) ABSTRACT

A beverage heating method includes the steps of: preheating a thermal storage heater unit in a predetermined temperature; dispensing a cool beverage from a beverage container via a dispensing conduit; heating the cool beverage by passing it through the thermal storage heater unit; and supplying the hot beverage from the thermal storage heater unit. A beverage heater apparatus includes a beverage container, a thermal storage heater unit, a liquid-dispensing valve, a control unit and a dispensing conduit. The beverage container connects with a heat-exchanging channel provided in the thermal storage heater unit. The thermal storage heater unit stores heat energy in a predetermined temperature by preheating. The control unit has a sensor to detect the temperature of the thermal storage heater unit. The liquid-dispensing valve is switched on or off to control the dispensing conduit which supplies cool beverage from the beverage container to the thermal storage heater unit.

22 Claims, 10 Drawing Sheets

BEVERAGE HEATING METHOD AND BEVERAGE HEATER APPARATUS USING THE SAME

BACKGROUND OF THE INVENTION

1. Field of the Invention

The present invention relates to a beverage heating method and a beverage heater apparatus using the same. Particularly, the present invention relates to the beverage heating method for pre-heating a thermal storage heater unit in a predetermined temperature in preparing to supply a hot beverage or hot water. More particularly, the present invention also relates to the beverage heater apparatus heating the beverage or liquid by passing it through the thermal storage heater unit which is preheated.

2. Description of the Related Art

As can be seen in FIG. 1, a conventional heater apparatus 8 includes a beverage container 81 and a heater unit 82 combined therewith. Generally, it would be desired that the beverage container 81 is made from a high thermal conductivity material, aluminum alloy or stainless steel for example. The beverage container 81 has an inner space to contain one or more beverages therein when heated. The heater unit 82 is wound on an outer circumference of the beverage container 81 for heating the beverage container 81 and beverage contained therein.

Still referring to FIG. 1, the beverage container 81 further includes a liquid inlet 811, a liquid outlet 812 and a ventilation hole 813. The liquid inlet 811 is disposed in a relatively higher portion of the beverage container 81 and is connected with a reservoir (not shown) that supplies a beverage to the beverage container 81. Correspondingly, the liquid outlet 812 disposed in a relatively lower portion of the beverage container 81 so as to discharge the heated beverage therefrom. The ventilation hole 813 is provided on a position adjacent to the liquid inlet 811, and is communicated with the inner space of the beverage container 81 for balancing inner pressure.

In operating the heater apparatus 8, a liquid stored in the reservoir may be supplied to the beverage container 81 via the liquid inlet 811 if a level of the liquid in the beverage container 81 is lower than a predetermined position. In heating operation, the heater unit 82 may be actuated to continuously heat the beverage container 81 until the liquid contained therein is higher than a predetermined temperature. Conversely, the heater unit 82 may be actuated to reheat the beverage container 81 if the liquid temperature is lower than a predetermined temperature. Once completely heating the liquid, the liquid outlet 812 can be controlled to turn on for providing a hot beverage.

Such a conventional heater apparatus 8 of FIG. 1, however, has several drawbacks during use. The primary problem with such a heater apparatus 8 is loss of thermal energy due to the fact that a great amount of steam generated by heating the liquid in the beverage container 81 is leaked out via the ventilation hole 813. This results in a waste of thermal energy.

Another problem with the use of such a conventional heater apparatus 8 is difficulty in maintaining a higher temperature of the liquid due to the loss of thermal energy. To maintain the higher temperature of the liquid sufficiently, there is a need for repeatedly actuating the heater unit 82. Another problem with the use of such a conventional heater apparatus 8 is due to the fact that requires reheating the entire liquid contained in the beverage container 81 even though a little amount of the heated (or boiling) liquid is released. Accordingly, this further results in a waste of thermal energy.

With regard to the problem naturally occurring during repeatedly heating the liquid in a long term, the liquid is susceptible to deterioration in taste. In addition to this, it would be undesired that repeatedly heating the liquid may cause precipitation of the contents contained in the liquid. Hence, there is a need for altering such a conventional heater apparatus.

As can be seen in FIG. 2, another conventional heater apparatus 9, as described in Taiwanese Patent Publication No. 282132, entitled “DRINKING WATER SUPPLYING DEVICE,” includes a water container 91, a water-heating unit 92, a controller 93 and a water outlet 94. The water container 91 connects with the water-heating unit 92 via a pipeline for supplying water. Disposed between the water container 91 and the water-heating unit 92 is a water pump (unlabeled) controlled by the controller 93 for dispensing water to pass through the water-heating unit 92. The water-heating unit 92 is preferably made from a material having high thermal conductivity, aluminum alloy or stainless steel for example. The water-heating unit 92 includes a quick-heating heater (not shown) which is controlled by the controller 93 for heating water passing through the water-heating unit 92. It is further apparent from FIG. 2 that the water-heating unit 92 further connects with the water outlet 94 via a pipeline. Accordingly, hot water can be supplied from the water outlet 94.

When the heater apparatus 9 is operated, the water outlet 94 is functioned to actuate the controller 93 for turning on the water pump. In this manner, water contained in the water container 91 is dispensed to water-heating unit 92 via the pipeline. Synchronously, the controller 93 also turns on the quick-heating heater provided in the water-heating unit 92 such that the temperature of the water-heating unit 92 may soar within a few seconds. Finally, hot water can be produced and output from the water outlet 94 via the pipeline.

As explained above, in water-heating operation, a heat-exchanging pipe preferably winds through an inner space of the water-heating unit 92 in such a way as to provide a longer distance for sufficiently exchanging heats with cool water. Consequently, the heat exchange efficiency of the water-heating unit 92 is enhanced.

However, there are a number of design limitations existing for this type of the heater apparatus 9 of FIG. 2. The primary problem with the use of such a heater apparatus 9 is due to the fact that there is a need for providing a high-power heater for quick heating the water-heating unit 92 within a few seconds. This may increase the risk of power overload. It would be undesired that operating the water-heating unit 92 as well as heating the entire water container 91 within a very short time results in a great deal of power consumption which produces greater amounts of waste heat. This heat can also result in damage to other components within the heater apparatus 9.

As is described in greater detail below, the present invention intends to provide a beverage heating method and a beverage heater apparatus using the same. A thermal storage heater unit is preheated and maintained at a predetermined temperature in preparing for supplying a hot beverage. Cool water must synchronously pass through the preheated thermal storage heater unit for instantaneously producing the hot beverage once the beverage requires supplying from the beverage heater apparatus. But, conversely, cool beverage may not pass through the preheated thermal storage heater unit if no beverage requires supplying from the beverage heater apparatus. Accordingly, a predetermined amount of the beverage may be heated according to the need. However, no beverage will be repeatedly heated in this heating process in such a way as to mitigate and overcome the above problem.

SUMMARY OF THE INVENTION

The primary objective of this invention is to provide a beverage heating method for preheating a thermal storage heater unit in a predetermined temperature. Cool beverage must synchronously pass through the preheated thermal storage heater unit while requiring supplying hot beverage or hot water. No cool water may pass through the preheated thermal storage heater unit if no hot beverage requires supplying. Accordingly, no beverage will be repeatedly heated in the heating process which only preheats and reheats the thermal storage heater.

The secondary objective of this invention is to provide a beverage heater apparatus having a thermal storage heater unit preheated in a predetermined temperature. Heat energy stored in the thermal storage heater unit can rapidly heat the beverage so as to supply hot beverage or hot water with a predetermined temperature. Accordingly, the heating process may be speeded up and waste energy may be avoided.

Another objective of this invention is to provide the beverage heater apparatus having a thermal sensor and a liquid-dispensing valve. The thermal sensor can detect a temperature of the thermal storage unit in determining switching on or off the liquid-dispensing valve. Accordingly, no beverage may be supplied if the temperature of the beverage or the thermal storage heater unit is lower than a predetermined temperature.

Another objective of this invention is to provide the beverage heater apparatus having an auxiliary dispensing conduit for retaining a beverage backflow from the thermal storage heater unit.

The beverage heating method in accordance with an aspect of the present invention includes the steps of: preheating a thermal storage heater unit in a predetermined temperature; dispensing a cool beverage from a beverage container via a dispensing conduit; heating the cool beverage by passing it through the thermal storage heater unit; and supplying the hot beverage from the thermal storage heater unit.

The beverage heater apparatus in accordance with a separate aspect of the present invention includes a beverage container, a thermal storage heater unit, a liquid-dispensing valve, a control unit and a dispensing conduit. The beverage container connects with a heat-exchanging channel provided in the thermal storage heater unit. The thermal storage heater unit can store heat energy in a predetermined temperature by preheating. The control unit has a thermal sensor used to detect the temperature of the thermal storage heater unit. The liquid-dispensing valve can be switched on or off to control the dispensing conduit which can supply a cool beverage from the beverage container to the thermal storage heater unit.

In a further separate aspect of the present invention, the dispensing conduit includes an auxiliary dispensing conduit connected therewith.

In a yet further separate aspect of the present invention, the thermal storage heater unit includes a first portion, a second portion and at least one adjusting member sandwiched therebetween.

In a yet further separate aspect of the present invention, the control unit includes a level-detecting member and at least one thermal sensor.

In a yet further separate aspect of the present invention, the beverage heater apparatus further includes a liquid-dispensing device provided with a dispensing compartment, a shaft member and a spring member.

In a yet further separate aspect of the present invention, the beverage heater apparatus further includes a power unit connecting with the liquid-dispensing device.

In a yet further separate aspect of the present invention, the beverage heater apparatus includes a first thermal storage heater unit and a second thermal storage heater unit.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 3A:
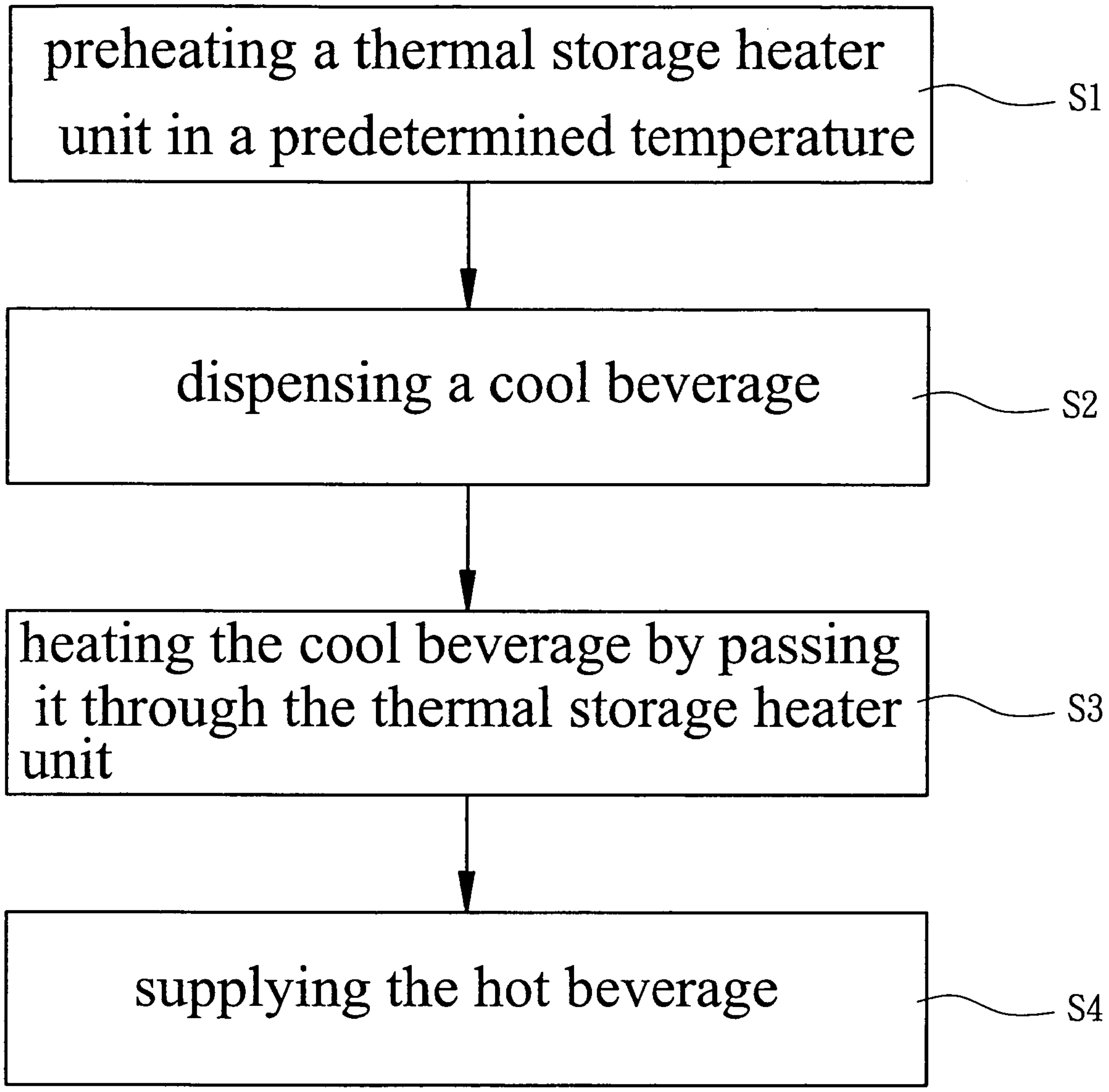
FIG. 3A is a flow chart illustrating a beverage heating method in accordance with the preferred embodiment of the present invention.

Referring now to FIG. 3A, a flow chart of a beverage heating method in accordance with the preferred embodiment of the present invention illustrated. The beverage heating method in accordance with the preferred embodiment of the present invention has four steps, including a heat-storing step identified as "S1", a beverage-dispensing step identified as "S2", a beverage-heating step identified as "S3" and a hot-beverage-supplying step identified as "S4".

Figure 3B:
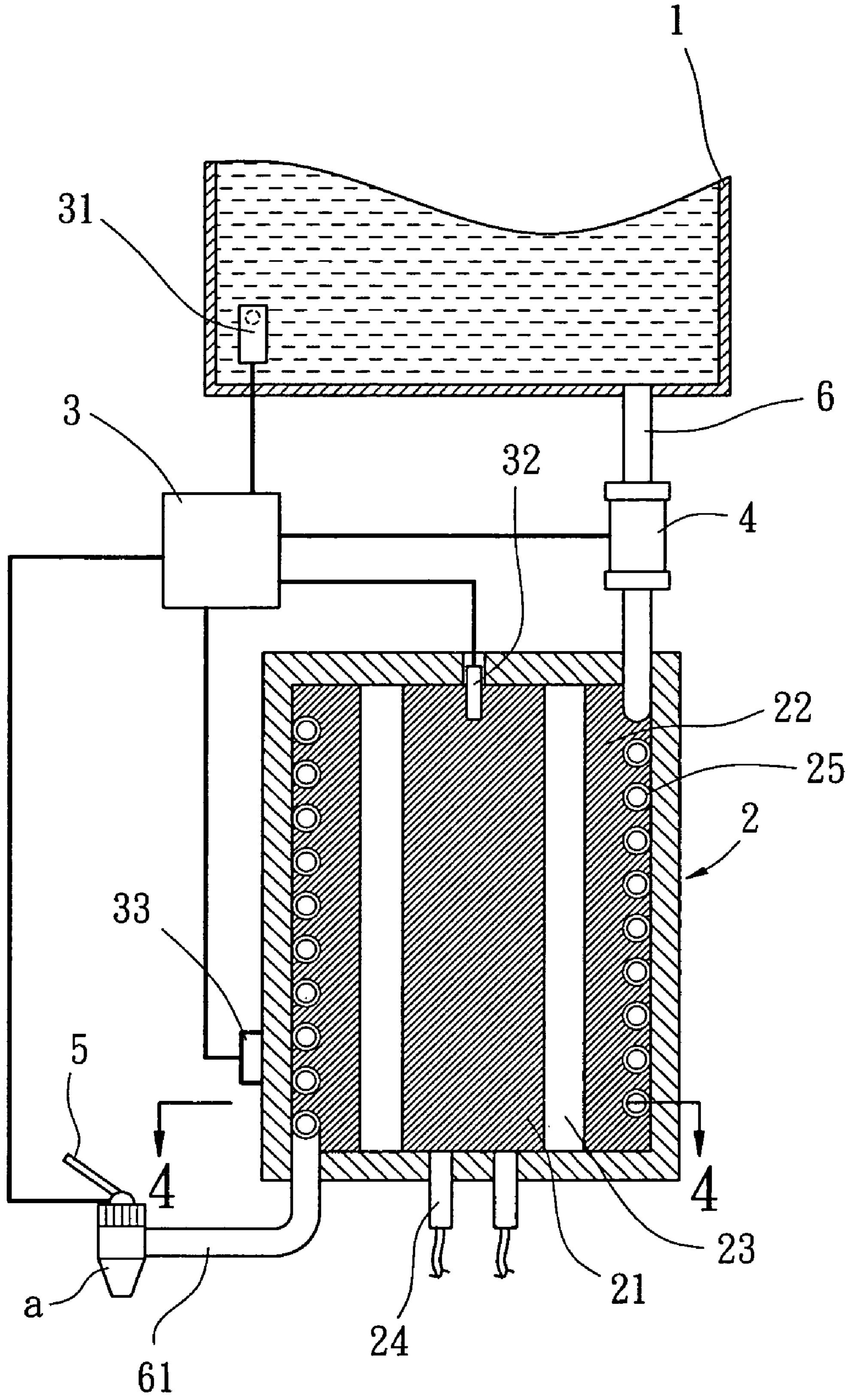
FIG. 3B is a cross-sectional view illustrating a beverage heater apparatus in accordance with a first embodiment of the present invention.
Figure 4:
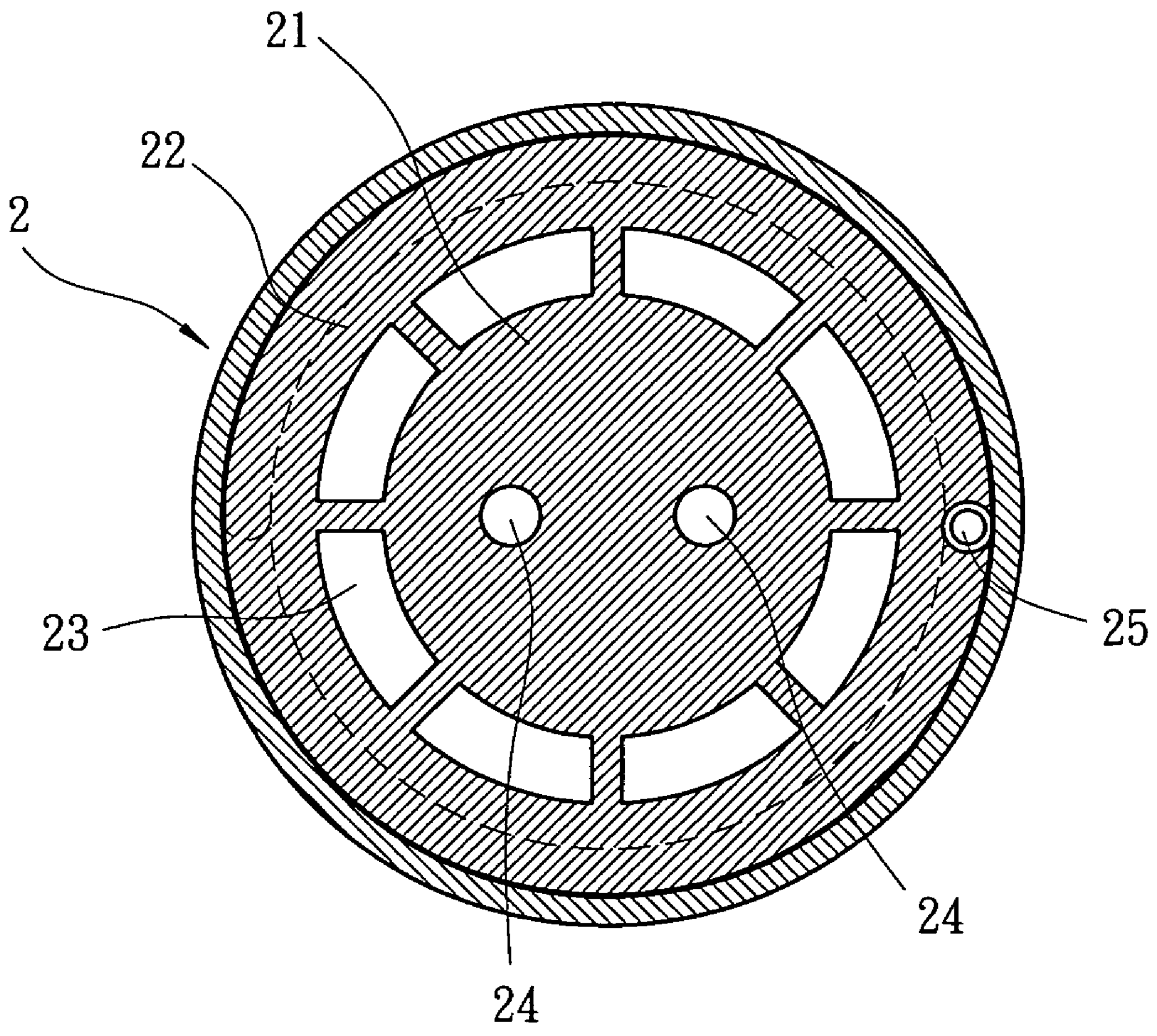
FIG. 4 is a cross-sectional view, taken along line 4-4 in FIG. 3B, illustrating a thermal storage heater unit of the beverage heater apparatus in accordance with the first embodiment of the present invention.

Turning now to FIG. 3B, a cross-sectional view of a beverage heater apparatus in accordance with a first embodiment of the present invention is illustrated. The beverage heater apparatus includes a beverage container 1, a thermal storage heater unit 2, a control unit 3, a liquid-dispensing valve 4, a beverage-supplying switch 5 and a dispensing conduit 6. In the illustrated embodiment, the thermal storage heater unit 2, the control unit 3 and the liquid-dispensing valve 4 may be provided in practicing the beverage heating method, by referring back to FIG. 3A. The beverage container 1 connects with the thermal storage heater unit 2 via the dispensing conduit 6 which is controlled by the liquid-dispensing valve 4. Turning now to FIG. 4, a cross-sectional view, taken along line 4-4 in FIG. 3B, of the thermal storage heater unit of the beverage heater apparatus in accordance with the first embodiment of the present invention is illustrated.

With reference to FIGS. 3B and 4, the positions of the beverage container 1, the thermal storage heater unit 2, the control unit 3, the liquid-dispensing valve 4, the beverage-supplying switch 5 and the dispensing conduit 6 are arranged in the beverage heater apparatus in place. Preferably, the thermal storage heater unit 2 includes a first portion 21, a second portion 22, at least one adjusting member 23 and at least one heating member 24. The thermal storage heater unit 2 further includes a heat-exchanging channel 25 which is preferably extended and wound in the second portion 22. In a preferred embodiment, the control unit 3 includes a level-detecting member 31, a first thermal sensor 32 and a second thermal sensor 33. The beverage heater apparatus of the present invention may be practiced and provided in a drinking facility or a hot-beverage heater.

Referring again to FIGS. 3A and 3B, the heat-storing step "S1" as well as the first step of the beverage heating method is implemented by preheating the thermal storage heater unit 2 in a predetermined temperature so as to store heat energy therein. Preferably, the heating member 24 is mechanically connected with the thermal storage heater unit 2 for conducting heat energy. In automatically heating operation, the control unit 3 may control the heating member 24 to continuously heat the thermal storage heater unit 2 so that the temperature of the thermal storage heater unit 2 may not be dropped and may be maintained at a predetermined temperature. The thermal storage heater unit 2 is made from a material such as aluminum, copper or alloys thereof having a high thermal conductivity. In the first embodiment, the heating member 24 is arranged to attach to the first portion 21 of the thermal storage heater unit 2.

Still referring to FIGS. 3A and 3B, the beverage-dispensing step "S2" as well as the second step of the beverage heating method is implemented by dispensing a relatively cool water or beverage via the dispensing conduit 6. Prior to executing the beverage-dispensing step "S2", the cool water or beverage may be contained in the beverage container 1. In an alternative embodiment, the cool water or beverage may be supplied from an exterior system (not shown) such that the beverage container 1 can be omitted.

With continued reference to FIGS. 3A and 3B, the beverage-heating step "S3" as well as the third step of the beverage heating method is implemented by passing the cool beverage through the thermal storage heater unit 2. The beverage-supplying switch 5 can actuate the control unit 3 to control the liquid-dispensing valve 4 in switching on or off operation. Meanwhile, the first thermal sensor 32 of the control unit 3 is provided to detect the temperature of the first portion 21 of the thermal storage heater unit 2 by means of thermal contact while the second thermal sensor 33 is provided to detect the temperature of a portion of the thermal storage heater unit 2 adjacent to the heat-exchanging channel 25 (second portion 22) by means of thermal contact. In an alternative embodiment, the control unit 3 can directly control switching on or off the liquid-dispensing valve 4 without providing the beverage-supplying switch 5 so that the beverage heater apparatus of the present invention is simplified.

Once the beverage-supplying switch 5 is pressed, the control unit 3 is actuated to send a control signal to switch on the liquid-dispensing valve 4. Meanwhile, the first thermal sensor 32 and the second thermal sensor 33 of the control unit 3 detect temperatures of the first portion 21 and the second portion 22 of the thermal storage heater unit 2 so as to ensure the temperature of the thermal storage heater unit 2 may not be lower than a predetermined temperature. The liquid-dispensing valve 4 is switched on to permit supplying the cool beverage from the beverage container 1 to the heat-exchanging channel 25 of the thermal storage heater unit 2 via the dispensing conduit 6 if the temperature of the thermal storage heater unit 2 is greater than the predetermined temperature. In this manner, heats of the thermal storage heater unit 2 are conducted to the cool beverage so that the hot beverage is produced. In an alternative embodiment, a single thermal sensor can replace the first thermal sensor 32 and the second thermal sensor 33 of the control unit 3.

Referring again to FIGS. 3A and 3B, the heat-storing step "S4" as well as the fourth step of the beverage heating method is implemented by supplying the hot beverage from the thermal storage heater unit 2. An outlet conduit 61 is arranged to connect with the heat-exchanging channel 25, and to supply the hot beverage from a nozzle identified as "a" in FIG. 3B. Preferably, the outlet conduit 61 is extended beyond the thermal storage heater unit 2 and the nozzle "a" is provided on an outer surface of the beverage heater apparatus. Preferably, the second thermal sensor 33 is provided to detect the temperature of a portion of the thermal storage heater unit 2 adjacent to the outlet conduit 61.

With reference to FIG. 3B, the beverage container 1 is an ordinary container device connecting with the thermal storage heater unit 2 via the liquid-dispensing valve 4 and the dispensing conduit 6. The control unit 3 is designed to have a control circuit for controlling components of the thermal storage heater unit 2 and the liquid-dispensing valve 4 in beverage-heating operation. Preferably, the liquid-dispensing valve 4 is selected from a solenoid valve (electromagnetic valve) or a pump device electrically connected with the control unit 3 so as to control turning on or off the dispensing conduit 6. The beverage-supplying switch 5 is electrically connected with the control unit 3, and is disposed at an end of the outlet conduit 61 where the nozzle "a" is provided.

Constructions of the thermal storage heater unit 2 shall be described in detail with reference to FIGS. 3B and 4. The first portion 21 of the thermal storage heater unit 2 is located at a center of the thermal storage heater unit 2 while the second portion 22 is located at an outer peripheral edge of the thermal storage heater unit 2. The first portion 21 and the second portion 22 of the thermal storage heater unit 2 are co-axially arranged with respect to a common longitudinal direction. The heating member 24 extends into the first portion 21. The heat-exchanging channel 25 winds its way in the second portion 22. The heat-exchanging channel 25 has a first end communicating with the dispensing conduit 6, and a second end communicating with the outlet conduit 61. Sandwiched between the first portion 21 and the second portion 22 is the adjusting member 23 which can adjust a degree of thermal conductivity between the first portion 21 and the second portion 22. Accordingly, there exists a thermal difference between the first portion 21 and the second portion 22. In a preferred embodiment, the heating member 24 is selected from an electric heater tube or an electronic heating device.

Referring again to FIG. 3B, the level-detecting member 31 of the control unit 3 is preferably disposed in the beverage container 1 to detect the level of the beverage contained therein. In addition to this, the first thermal sensor 32 of the control unit 3 can reflect the temperature of the first portion 21 of the thermal storage heater unit 2. Similarly, the second thermal sensor 33 of the control unit 3 arranged at the second portion 22 or a position adjacent an outlet of the heat-exchanging channel 25 can reflect the temperature of the second portion 22 or the heat-exchanging channel 25 of the thermal storage heater unit 2.

Referring particularly to FIGS. 3B and 4, during using the beverage heater apparatus, the heating member 24 starts heating the first portion 21 and the second portion 22 of the thermal storage heater unit 2 until it reaches a predetermined temperature. Once the temperature of the thermal storage heater unit 2 exceeds, the control unit 3 stops or terminates the heating operation of the heating member 24 so as to avoid overheating the thermal storage heater unit 2. In heating operation, the adjusting member 23 is designed to adjust the temperature of the second portion 22 of the thermal storage heater unit 2. In this manner, the heat-storing step "S1" for the thermal storage heater unit 2 is carried out while no beverage passing through the heat-exchanging channel 25. Consequently, it would be desired that the heating member 24 could be a low power heater device.

Still referring to FIGS. 3B and 4, in supplying hot beverage, when the beverage-supplying switch 5 is pressed, the control unit 3 is actuated to send a control signal to the liquid-dispensing valve 4 for switching on it. Subsequently, the control unit 3 can switch on the liquid-dispensing valve 4 according to the temperature detected from the second thermal sensor 33 of the control unit 3. The liquid-dispensing valve 4 is switched on to supply the cool beverage to the thermal storage heater unit 2 if the temperature of the second portion 22 is greater than a predetermined temperature. But, conversely, the liquid-dispensing valve 4 is switched off and the thermal storage heater unit 2 is reheated if the temperature of the second portion 22 is lower than a predetermined temperature.

With continued reference to FIGS. 3B and 4, the beverage supplied from the dispensing conduit 6 runs along the way of the heat-exchanging channel 25 extended in the second portion 22 of the thermal storage heater unit 2. The heat-exchanging channel 25 can conduct heats stored in the second portion 22 of the thermal storage heater unit 2 to the beverage which is heated in a predetermined temperature. Finally, the hot beverage can be passed through the outlet conduit 61, and released from the nozzle "a".

With continued reference to FIGS. 3B and 4, during supplying no beverage, the first thermal sensor 32 and the second thermal sensor 33 of the control unit 3 still detect the temperature of the first portion 21 and the second portion 22 of the thermal storage heater unit 2. The heating operation on the thermal storage heater unit 2 may be continued if the temperature of the first portion 21 or the second portion 22 is lower than a predetermined low temperature. Conversely, the heating operation on the thermal storage heater unit 2 may be terminated if the temperature of the first portion 21 or the second portion 22 is higher than a predetermined high temperature. Advantageously, the thermal storage heater unit 2 may not be overheated in heating operation. Additionally, the level-detecting member 31 of the control unit 3 still detects the level of the beverage contained in the beverage container 1. The liquid-dispensing valve 4 may not be switched on if the level of the beverage is lower than a predetermined value. In this way, the control unit 3 can control a warning device (not shown) or a buzzer (not shown) to send out a warning signal. Consequently, the beverage-supplying switch 5 cannot be operated due to the fact that the apparatus is in response to the warning signal.

Figure 5:
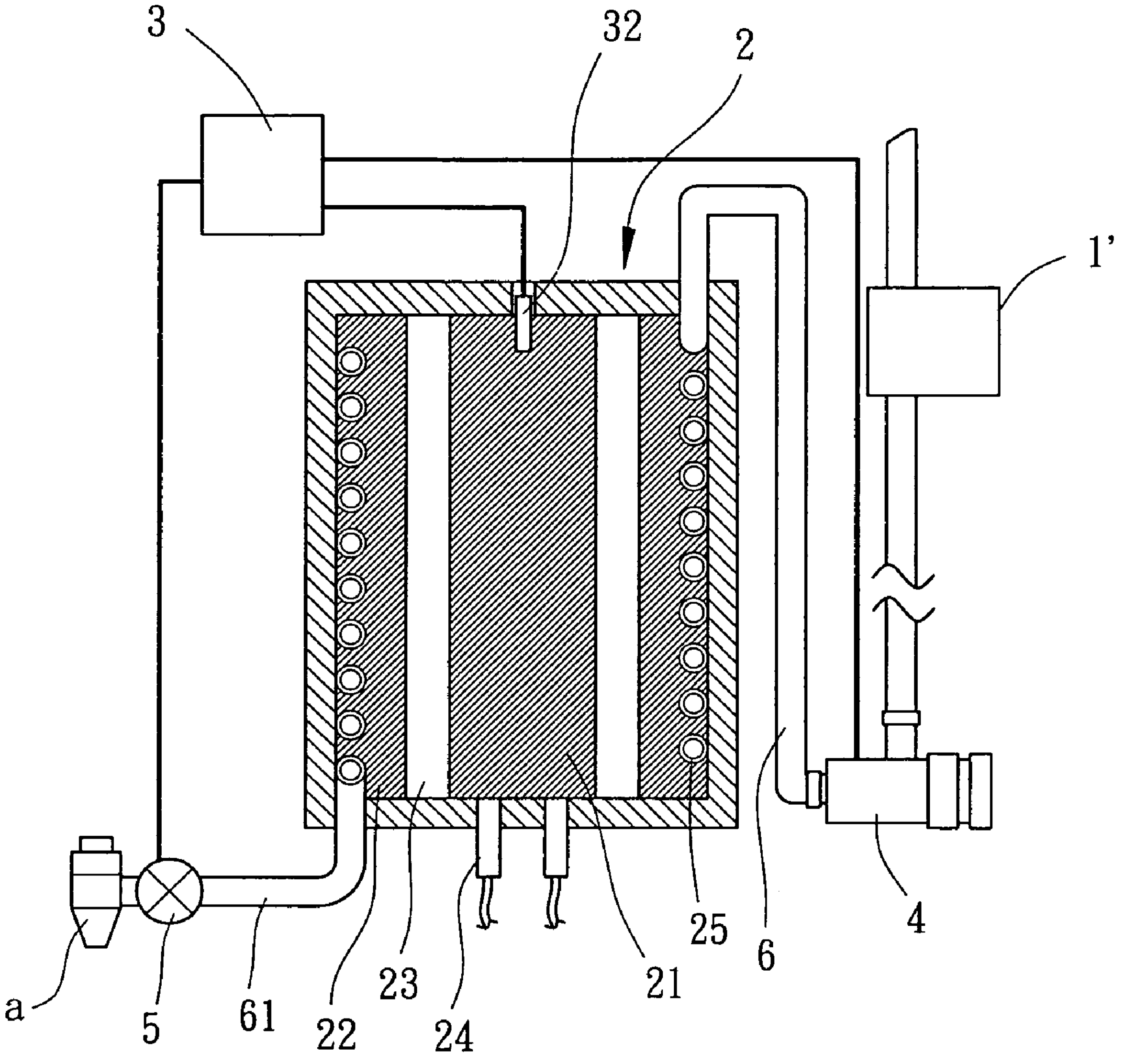
FIG. 5 is a cross-sectional view illustrating the beverage heater apparatus in accordance with a second embodiment of the present invention.

Turning now to FIG. 5, a cross-sectional view of the beverage heater apparatus in accordance with a second embodiment of the present invention is illustrated. In comparison with the first embodiment, the beverage container 1' of the second embodiment is selected from a water filter, a RO device or a water supply device. In the second embodiment, the level-detecting member 31 and the second thermal sensor 33 of the control unit 3 are omitted such that the control unit 3 is only provided with the first thermal sensor 32 for the sake of simplifying the entire structure.

Still referring to FIG. 5, the heating operation on the thermal storage heater unit 2 may be continued and the liquid-dispensing valve 4 may be switched off if the temperature of the first portion 21 is lower than a predetermined low temperature. Subsequently, the beverage-supplying switch 5 cannot be operated due to the fact that the liquid-dispensing valve 4 is switched off. Accordingly, no unboiled beverage can be released.

Figure 6:
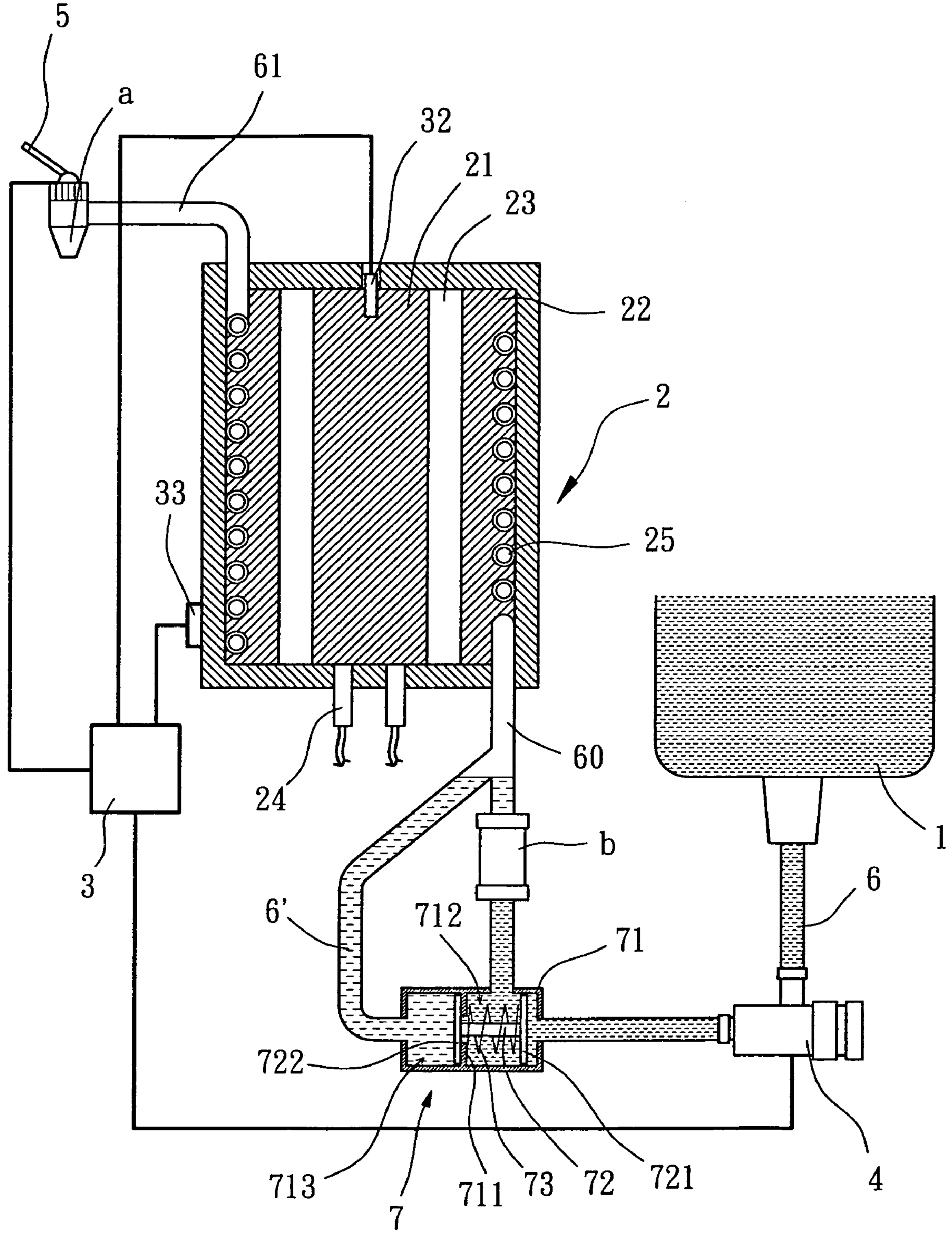
FIG. 6 is a cross-sectional view illustrating the beverage heater apparatus in accordance with a third embodiment of the present invention, with a liquid-dispensing device in its close state.

Turning now to FIG. 6, a cross-sectional view of the beverage heater apparatus in accordance with a third embodiment of the present invention is illustrated. In comparison with the first embodiment, the beverage heater apparatus of the third embodiment has a position of the nozzle "a" higher than that of the beverage container 1 or the liquid-dispensing valve 4. In the third embodiment, the beverage heater apparatus further includes a liquid-dispensing unit 7, an auxiliary dispensing conduit 6' and a main dispensing conduit 60. The liquid-dispensing device 7 is disposed between the beverage container 1 and the thermal storage heater unit 2. The liquid-dispensing device 7 has a first end communicating with the beverage container 1 via the dispensing conduit 6, and a second end communicating with the thermal storage heater unit 2 via the main dispensing conduit 60. When the beverage-supplying switch 5 is released, the beverage remained in the heat-exchanging channel 25 causes a beverage backflow in a direction running from the thermal storage heater unit 2 to the beverage container 1 through the main dispensing conduit 60 and the auxiliary dispensing conduit 6'. Preferably, the auxiliary dispensing conduit 6' has a first end communicating with the liquid-dispensing device 7, and a second end communicating with the main dispensing conduit 60.

Still referring to FIG. 6, the liquid-dispensing device 7 includes a dispensing compartment 71, a shaft member 72 and a spring member 73. The dispensing compartment 71 is provided with a separating wall 711, an inlet space 712 and a collecting space 713. The separating wall 711 is formed on an inner circumference of the dispensing compartment 71 to separate the inlet space 712 from the collecting space 713. The separating wall 711 delimits an axial hole (unlabeled) to permit the passage of the shaft member 72 which is reciprocated in the dispensing compartment 71. Preferably, the inlet space 712 communicates with the beverage container 1 and the thermal storage heater unit 2 via the dispensing conduit 6 and the main dispensing conduit 60 respectively. In this manner, the cool beverage supplied from the beverage container 1 may pass through the inlet space 712 of the liquid-dispensing device 7 and the thermal storage heater unit 2. On the other hand, the collecting space 713 communicates with the thermal storage heater unit 2 via the auxiliary dispensing conduit 6'. Prior to connecting with the thermal storage heater unit 2, the main dispensing conduit 60 connects with the auxiliary dispensing conduit 6'. When the beverage backflow occurs, the hot beverage from the heat-exchanging channel 25 may pass through a section of the main dispensing conduit 60 and an entire section of the auxiliary dispensing conduit 6', and may thus be retained in the collecting space 713.

With continued reference to FIG. 6, the shaft member 72 is received and reciprocated in the dispensing compartment 71. Preferably, the shaft member 72 has a first valve plate 721 at its first end and a second valve plate 722 at its second end. The first valve plate 721 is received in the inlet space 712 of the dispensing compartment 71 for sealing an inlet thereof so that the first valve place 721 can disconnect the main dispensing conduit 60 from the dispensing conduit 6 to avoid the cool beverage entering the thermal storage heater unit 2. Similarly, the second valve plate 722 is received in the collecting space 713 of the dispensing compartment 71 for sealing the axial hole of the separating wall 711 so that the second valve plate 722 can disconnect the collecting space 713 from the inlet space 712. Furthermore, the second valve plate 722 is engaged with the separating wall 711 so that a longitudinal movement of the second valve plate 722 is confined. The spring member 73 is mounted on the shaft member 72, and has a first end engaged with the first valve plate 721 and a second end engaged with the separating wall 711. The spring member 73 provides a bias force exerting on the first valve plate 721 to ensure contact between the second valve plate 722 and the separating wall 711. Accordingly, a sealing effect of the second valve plate 722 on the axial hole of the separating wall 711 is carried out. Meanwhile, the first valve plate 721 may preferably close the passage of the inlet of the inlet space 712 so as to disconnect the inlet space 712 of the liquid-dispensing device 7 from the dispensing conduit 6.

With continued reference to FIG. 6, during using the beverage heater apparatus, the heating member 24 starts heating the first portion 21 and the second portion 22 of the thermal storage heater unit 2 until there reaches a predetermined temperature. Once the temperature of the thermal storage heater unit 2 exceeds, the control unit 3 stops or terminates the heating operation of the heating member 24 so as to avoid overheating the thermal storage heater unit 2. When the beverage-supplying switch 5 is pressed, the control unit 3 is actuated to send a control signal to the liquid-dispensing valve 4. In this manner, the cool beverage contained in the beverage container 1 may pass through the dispensing conduit 6 and then arrive at the liquid-dispensing device 7.

Figure 7:
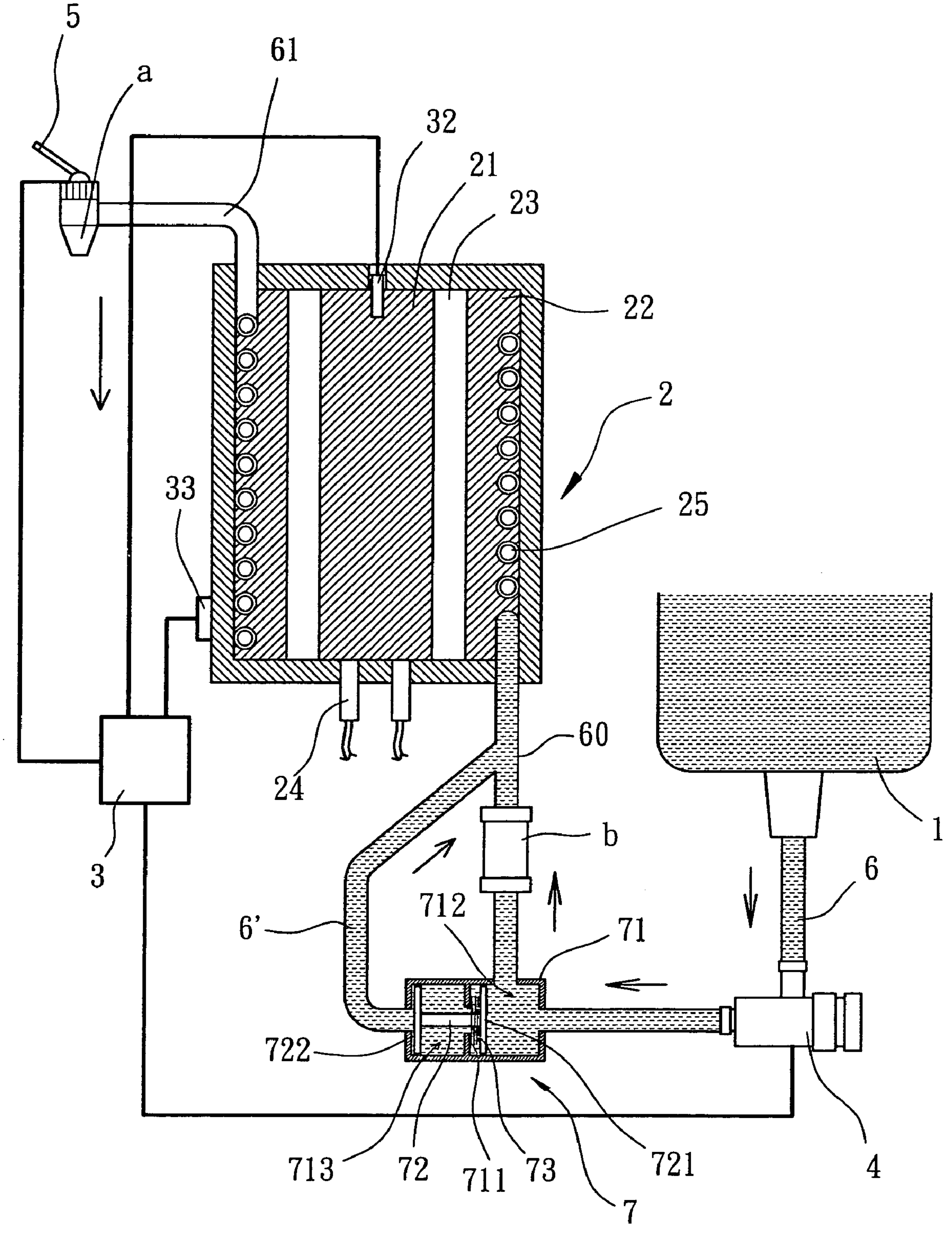
FIG. 7 is a cross-sectional view illustrating the beverage heater apparatus in accordance with the third embodiment of the present invention, with the liquid-dispensing device in its open state.

Turning now to FIG. 7, another cross-sectional view of the beverage heater apparatus in accordance with the third embodiment of the present invention is illustrated. Once the cool beverage arrives at the liquid-dispensing device 7, the cool beverage exerts a pressure on the first valve plate 721 for compressing the spring member 73. This results in a longitudinal movement of the shaft member 72 toward the collecting space 713 when the bias force of the spring member 73 is overcome. Meanwhile, the first valve plate 721 and the second valve plate 722 are disengaged from the inlet of the inlet space 712 and the axial hole of the separating wall 711 such that the cool beverage may enter the inlet space 712 and the collecting space 713. The second valve plate 722 may also cause a flow of the beverage collected in the collecting space 713. The cool beverage dispensed from the beverage container 1 may pass through the liquid-dispensing device 7 and the main dispensing conduit 60 that permits dispensing the beverage through the heat-exchanging channel 25 of the thermal storage heater unit 2. On the other hand, the boiled beverage collected in the collecting space 713 may synchronously pass through the auxiliary dispensing conduit 6' and then return to the main dispensing conduit 60. Finally, the beverage may pass through the heat-exchanging channel 25 which winds its way in the second portion 22 of the thermal storage heater unit 2.

Still referring to FIG. 7, when the beverage-supplying switch 5 is released, the control unit 3 terminates to send a control signal to the liquid-dispensing valve 4 such that the liquid-dispensing valve 4 is switched off. The first valve plate 721 and the second valve plate 722 automatically close the passages of the inlet of the inlet space 712 and the axial hole of the separating wall 711 since no beverage pressure is exerted on the first valve plate 721 and the second valve plate 722 by supplying no beverage to the liquid-dispensing device 7. The beverage remained in the heat-exchanging channel 25 causes the beverage backflow in a direction running from the thermal storage heater unit 2 to the liquid-dispensing device 7 through the main dispensing conduit 60 and the auxiliary dispensing conduit 6'. A check valve identified as "b" is provided on the main dispensing conduit 60 to prevent the beverage backflow to pass through it in a reverse direction. In this manner, the beverage backflow can only pass through the auxiliary dispensing conduit 6' to return to the collecting space 712 of the liquid-dispensing device 7.

Figure 8:
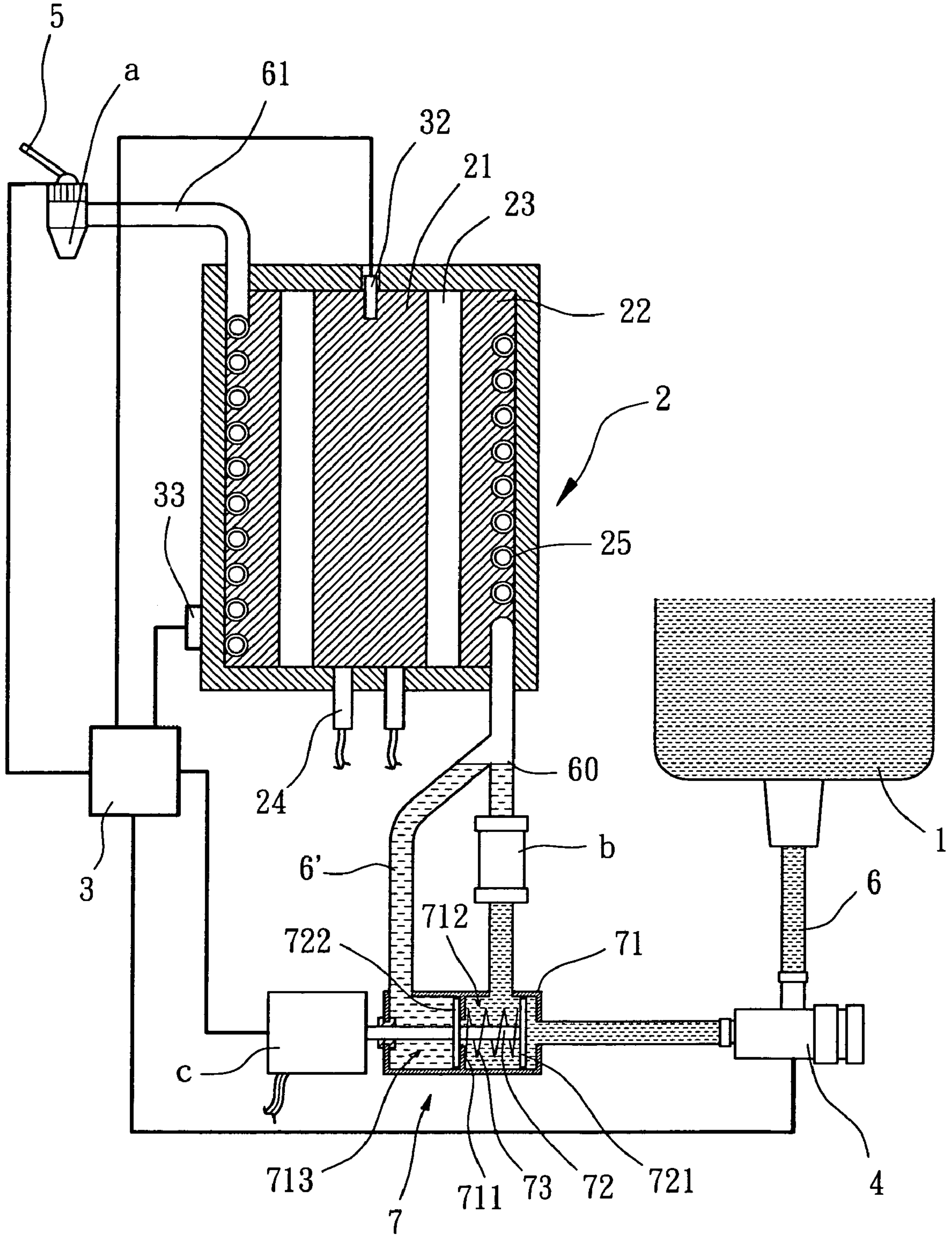
FIG. 8 is a cross-sectional view illustrating the beverage heater apparatus in accordance with a fourth embodiment of the present invention.

Turning now to FIG. 8, a cross-sectional view of the beverage heater apparatus in accordance with a fourth embodiment of the present invention is illustrated. In comparison with the third embodiment, the beverage heater apparatus of the fourth embodiment further includes a power unit identified as "c" connecting with the liquid-dispensing device 7. In a preferred embodiment, the power unit "c" is selected from a solenoid valve (electromagnet valve) or a motor operated valve. The power unit "c" is arranged at a position spaced apart from the liquid-dispensing device 7, and is connected with the second valve plate 722 of the shaft member 72. When the beverage-supplying switch 5 is pressed, the control unit 3 can switch on the liquid-dispensing valve 4 and the power unit "c" synchronously. In this way, the power unit "c" can provide a pulling force exerting on the second valve plate 722 of the shaft member 72 to overcome the bias force of the spring member 73. This may results in a longitudinal movement of the shaft member 72 toward the collecting space 713. Once moved, the sealing effect of the second valve plate 722 of the shaft member 72 on the axial hole of the separating wall 711 is removed such that the inlet space 712 of the dispensing compartment 71 communicates with the collecting space 713. In addition, the sealing effect of the first valve plate 721 of the shaft member 72 on the inlet of the inlet space 712 is removed such that the cool beverage can pass through the inlet space 712 and the collecting space 713. Consequently, the boiled beverage retained in the collecting space 713 may be forced to pass through the auxiliary dispensing conduit 6' and then to return to the main dispensing conduit 60. Finally, the boiled beverage is dispensed to pass through the thermal storage heater unit 2.

Still referring to FIG. 8, when the beverage-supplying switch 5 is released, the control unit 3 can switch off the liquid-dispensing valve 4 and the power unit "c" synchronously. In this way, the pulling force of the power unit "c" exerting on the second valve plate 722 of the shaft member 72 may be eliminated. Subsequently, the bias force of the spring member 73 may cause a return movement of the shaft member 72 so that the second valve plate 722 of the shaft member 72 is engaged with the axial hole of the separating wall 711. Meanwhile, the first valve plate 721 of the shaft member 72 is engaged with the inlet of the inlet space 712.

Figure 9:
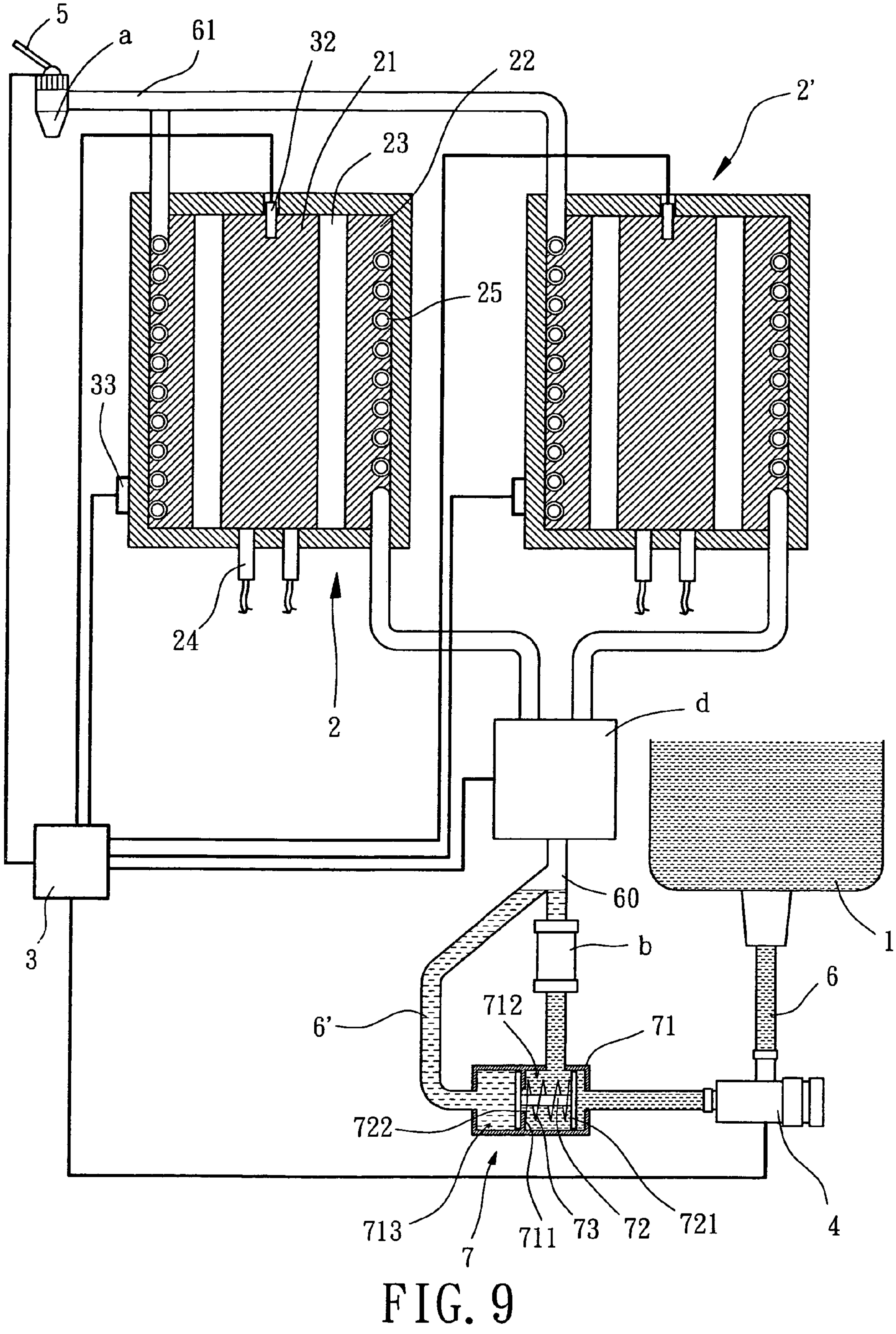
FIG. 9 is a cross-sectional view illustrating the beverage heater apparatus having a pair of heating units in accordance with a fifth embodiment of the present invention.

Turning now to FIG. 9, a cross-sectional view of the beverage heater apparatus having a pair of heating units in accordance with a fifth embodiment of the present invention is illustrated. In comparison with the first embodiment, the beverage heater apparatus of the fifth embodiment includes a first thermal storage heater unit 2 and a second thermal storage heater unit 2'. The main dispensing conduit 60 arranged between the two thermal storage heater units 2, 2' and the liquid-dispensing device 7 is provided with a diverter valve identified as "d" which is designed to communicate with the two thermal storage heater units 2, 2'. For example, once the temperature of the first thermal storage heater unit 2 is lower than a predetermined temperature, the control unit 3 can control the diverter valve "d" to cut off the main dispensing conduit 60 to the first thermal storage heater unit 2. Also, the control unit 3 can control the heating member 24 reheating the first thermal storage heater unit 2. Subsequently, the control unit 3 can control the diverter valve "d" to communicate the main dispensing conduit 60 with the second thermal storage heater unit 2' instead of the first thermal storage heater unit 2. Consequently, the cool beverage is dispensed to pass through the second thermal storage heater unit 2', and the hot beverage supplied therefrom is provided in the nozzle "a".

Figure 1:
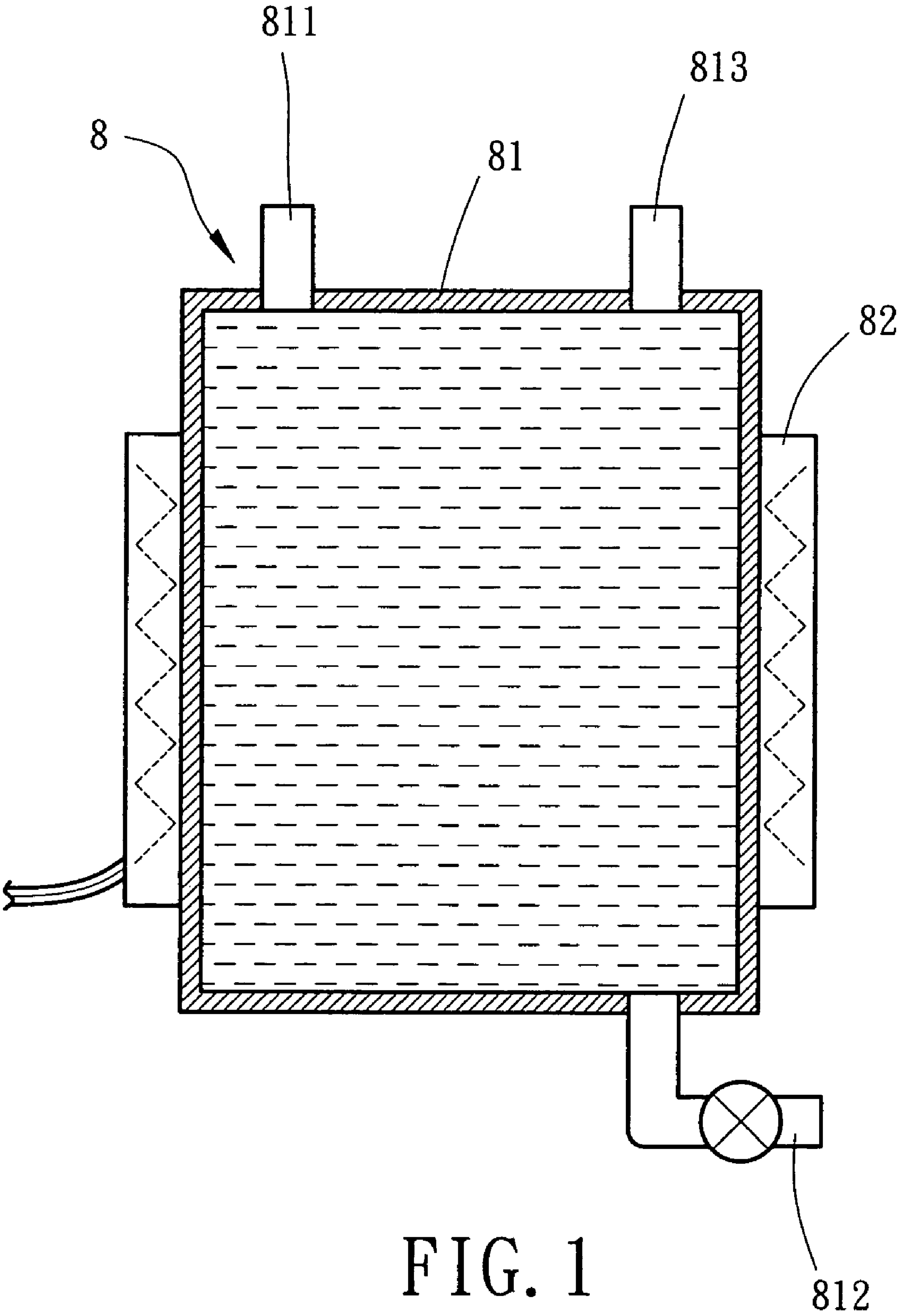
FIG. 1 PRIOR ART
FIG. 1 is a cross-sectional view illustrating a conventional heater apparatus in accordance with the prior art.

Referring back to FIG. 1, the conventional heater apparatus 8 requires reheating the entire liquid contained in the beverage container 81 repeatedly even though a little amount of the heated (or boiling) liquid is released or the temperature of the beverage container 81 is lower than a predetermined temperature. Accordingly, this results in unnecessary power consumption and deterioration in taste of the beverage.

Figure 2:
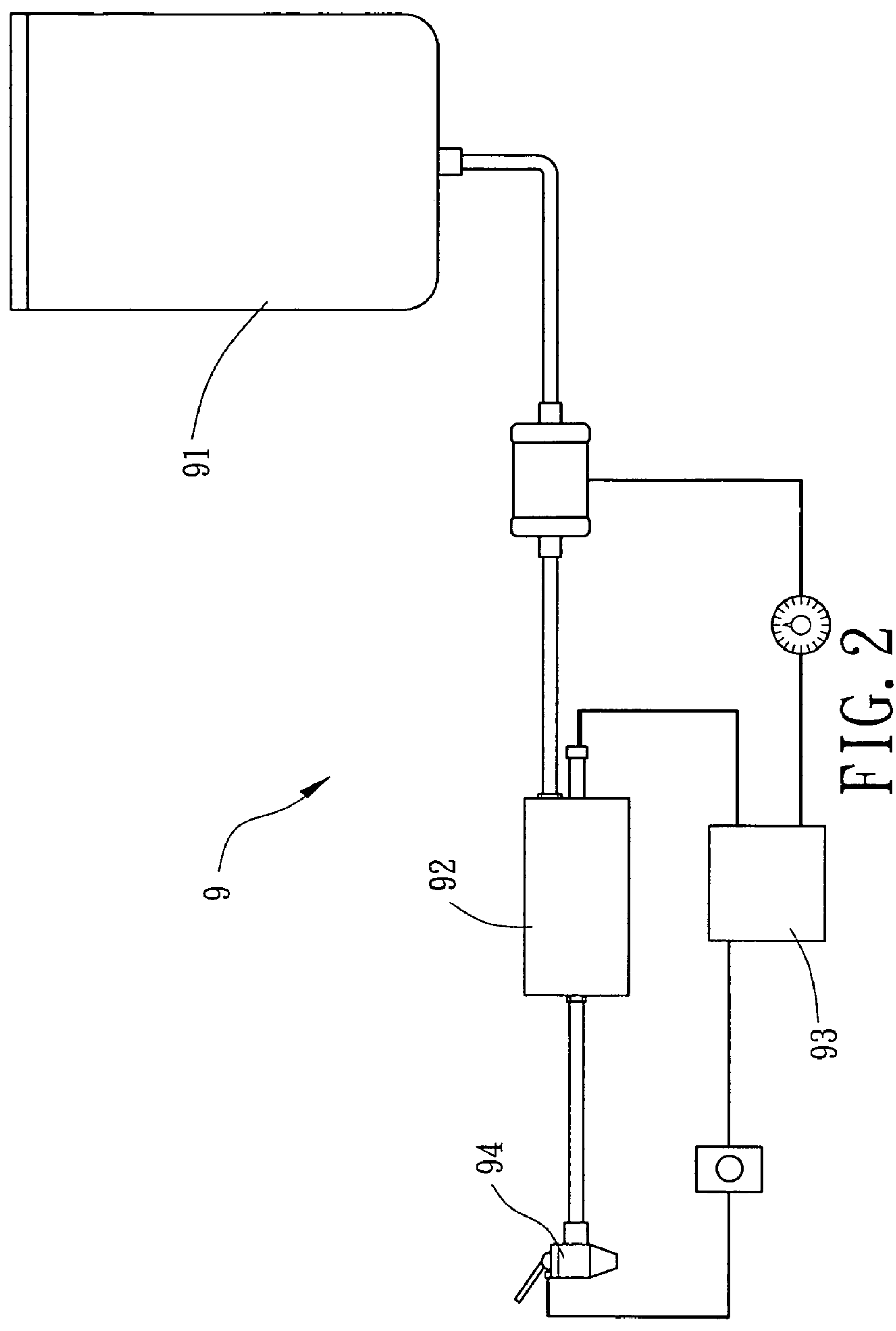
FIG. 2 PRIOR ART
FIG. 2 is a schematic view illustrating another conventional heater apparatus in accordance with the prior art.

Referring further back to FIG. 2, the conventional heater apparatus 9 requires providing a high-power heater for quick heating the water-heating unit 92 within a few seconds to reach a predetermined temperature. This may increase the risk of power overload, and further result in highly possible damage to the components of the heater apparatus 9.

It will be apparent from the aforementioned discussions that the control unit 3 of the beverage heater apparatus in accordance with the present invention can control the heating member 24 to preheat or reheat the thermal storage heater unit 2 in a predetermined temperature. In beverage-supplying operation, a required amount of the cool beverage is only dispensed to pass through the thermal storage heater unit 2 when needed. No beverage will pass through the thermal storage heater unit 2 if no hot beverage is needed.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A beverage heater apparatus, comprising:

a thermal storage heater unit provided with a heat-exchanging channel and a heating member, and the heating member and the heat-exchanging channel being embedded in the thermal storage heater, the heat-exchanging channel passing through the thermal storage heater, a first end of the heat-exchanging channel communicating with a dispensing conduit, and a second end of the heat-exchanging channel communicating with an outlet conduit, the heating member heating the thermal storage heater unit to a predetermined temperature for storing thermal energy;

a control unit electrically connected with the heating member for controlling it to selectively heat the thermal storage heater unit according to a detected temperature; and a liquid-dispensing valve electrically connected with the control unit which can control switching on or off the liquid-dispensing valve according to the detected temperature for dispensing a cool beverage to pass through the thermal storage heater unit;

wherein the control unit controls switching on or off the liquid-dispensing valve to dispense the cool beverage from the dispensing conduit to the outlet conduit through the heat-exchanging channel of the thermal storage heater unit in order to produce a hot beverage at the predetermined temperature.

2. The beverage heater apparatus as defined in claim 1, further comprising a beverage container, and the dispensing conduit connected thereto for containing and supplying the cool beverage.

3. The beverage heater apparatus as defined in claim 2, wherein the dispensing conduit connects with the outlet conduit having an end on which to provide a nozzle for supply the hot beverage.

4. The beverage heater apparatus as defined in claim 1, further comprising a beverage-supplying switch electrically connected with the control unit so as to control switching on or off the liquid-dispensing valve.

5. The beverage heater apparatus as defined in claim 1, wherein the control unit includes a first thermal sensor provided to detect a temperature of the thermal storage heater unit by means of thermal contact.

6. The beverage heater apparatus as defined in claim 5, wherein the control unit further includes a second thermal sensor provided to detect a temperature of a portion of the thermal storage heater unit adjacent to the heat-exchanging channel by means of thermal contact.

7. The beverage heater apparatus as defined in claim 1, wherein the thermal storage heater unit includes a first portion to connect with the heating member, and a second portion in which the heat-exchanging channel is extended.

8. The beverage heater apparatus as defined in claim 7, wherein the thermal storage heater unit further includes at least one adjusting member arranged between the first portion and the second portion for adjusting a degree of thermal conductivity therebetween.

9. The beverage heater apparatus as defined in claim 1, wherein the heating member is selected from an electric heater tube or an electronic heating device.

10. The beverage heater apparatus as defined in claim 1, wherein the control unit includes a thermal sensor provided to detect a temperature of a portion of the thermal storage heater unit adjacent to the outlet conduit.

11. The beverage heater apparatus as defined in claim 1, wherein the control unit includes a level-detecting member to detect a level of the cool beverage contained in a beverage container.

12. The beverage heater apparatus as defined in claim 1, wherein the liquid-dispensing valve is selected from a solenoid valve or a pump device.

13. The beverage heater apparatus as defined in claim 1, further comprising a liquid-dispensing device disposed between a beverage container and the thermal storage heater unit.

14. The beverage heater apparatus as defined in claim 13, wherein the liquid-dispensing device includes a dispensing compartment provided with a separating wall to define an inlet space and a collecting space therein.

15. The beverage heater apparatus as defined in claim 14, wherein the inlet space of the liquid-dispensing device connects with the beverage container via the dispensing conduit which supplies the cool beverage from the beverage container; and wherein the inlet space of the liquid-dispensing device further connects with the thermal storage heater unit via a main dispensing conduit.

16. The beverage heater apparatus as defined in claim 14, wherein the collecting space of the liquid-dispensing device connects with the thermal storage heater unit via an auxiliary dispensing conduit which further connects with the main dispensing conduit for dispensing a beverage contained in the collecting space to main dispensing conduit via the auxiliary dispensing conduit.

17. The beverage heater apparatus as defined in claim 14, wherein the liquid-dispensing device further includes a shaft member and a spring member; wherein the shaft member is received in the dispensing compartment for reciprocation; and wherein the spring member is mounted on the shaft member, and has a first end engaged with the shaft member and a second end engaged with the separating wall.

18. The beverage heater apparatus as defined in claim 17, wherein the shaft member has a first valve plate at its first end and a second valve plate at its second end, the first valve plate is received in the inlet space of the dispensing compartment while the second valve plate is received in the collecting space of the dispensing compartment.

19. The beverage heater apparatus as defined in claim 13, wherein the liquid-dispensing device includes a main dispensing conduit and a check valve provided thereon.

20. The beverage heater apparatus as defined in claim 17, wherein the liquid-dispensing device includes a power unit connected with the shaft member.

21. The beverage heater apparatus as defined in claim 1, further comprising another thermal storage heater unit and a diverter valve, the diverter valve dispensing the cool beverage to pass through one of the two thermal storage heater units.

22. The beverage heater apparatus as defined in claim 2, wherein the liquid-dispensing valve is provided on the dispensing conduit.

* * * * *